United States Patent
Tan et al.

(10) Patent No.: US 10,471,595 B2
(45) Date of Patent: Nov. 12, 2019

(54) SYSTEMS AND METHODS FOR CONTROL OF ROBOTIC MANIPULATION

(71) Applicant: General Electric Company, Schenectady, NY (US)

(72) Inventors: Huan Tan, Niskayuna, NY (US);
Balajee Kannan, Niskayuna, NY (US);
Yonatan Gefen, Niskayuna, NY (US);
Romano Patrick, Atlanta, GA (US);
Omar Al Assad, Niskayuna, NY (US);
Douglas Forman, Niskayuna, NY (US);
Charles Theurer, Alplaus, NY (US);
John Lizzi, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 236 days.

(21) Appl. No.: 15/293,905

(22) Filed: Oct. 14, 2016

(65) Prior Publication Data

US 2017/0341231 A1 Nov. 30, 2017

Related U.S. Application Data

(60) Provisional application No. 62/343,375, filed on May 31, 2016.

(51) Int. Cl.
*B25J 9/16* (2006.01)
*B25J 19/02* (2006.01)
(Continued)

(52) U.S. Cl.
CPC ............. *B25J 9/1664* (2013.01); *B25J 9/162* (2013.01); *B25J 9/1661* (2013.01); *B25J 19/023* (2013.01);
(Continued)

(58) Field of Classification Search
CPC . B25J 5/007; B25J 9/1697; B25J 9/162; B25J 19/023; B25J 5/00; B25J 9/1664;
(Continued)

(56) References Cited

U.S. PATENT DOCUMENTS

| 5,429,329 A | 7/1995 | Wallace et al. |
| 7,167,095 B2 | 1/2007 | Carrender |

(Continued)

FOREIGN PATENT DOCUMENTS

| CN | 101726296 B | 10/2013 |
| WO | 2008017821 A2 | 2/2008 |
| WO | 2009105211 A2 | 8/2009 |

OTHER PUBLICATIONS

Mobile Detection Assessment and Response System (MDARS); http://www.globalsecurity.org/military/systems/ground/mdars.htm.
(Continued)

*Primary Examiner* — Jason Holloway
(74) *Attorney, Agent, or Firm* — Joseph F. Harding; The Small Patent Law Group LLC

(57) ABSTRACT

A robot system is provided that includes a base, an articulable arm, a visual acquisition unit, and at least one processor. The articulable arm extends from the base and is configured to be moved toward a target. The visual acquisition unit is mounted to the arm or the base, and acquires environmental information. The at least one processor is operably coupled to the arm and the visual acquisition unit, the at least one processor configured to: generate an environmental model using the environmental information; select, from a plurality of planning schemes, using the environmental model, at least one planning scheme to translate the arm toward the target; plan movement of the arm toward the target using the selected at least one planning
(Continued)

scheme; and control movement of the arm toward the target using the at least one selected planning scheme.

20 Claims, 3 Drawing Sheets

(51) Int. Cl.
*G05D 1/02* (2006.01)
*B25J 5/00* (2006.01)

(52) U.S. Cl.
CPC ............. *G05D 1/0246* (2013.01); *B25J 5/007* (2013.01); *B25J 9/1697* (2013.01); *G05B 2219/39543* (2013.01); *G05B 2219/40298* (2013.01); *G05B 2219/40609* (2013.01); *G05D 1/0251* (2013.01)

(58) Field of Classification Search
CPC ... B25J 9/1661; G05D 1/0274; G05D 1/0251; G05D 1/0246; G05D 2219/40298; G05D 2219/39543; G05D 2219/40609
See application file for complete search history.

(56) References Cited

U.S. PATENT DOCUMENTS

| | | | |
|---|---|---|---|
| 7,206,668 B2* | 4/2007 | Okamoto | B25J 5/007 318/568.12 |
| 7,321,305 B2 | 1/2008 | Gollu | |
| 7,558,634 B2 | 7/2009 | Woergoetter et al. | |
| 7,860,614 B1* | 12/2010 | Reger | B25J 9/1671 700/10 |
| 8,301,318 B2 | 10/2012 | Lacaze et al. | |
| 9,415,513 B2 | 8/2016 | Tian et al. | |
| 2005/0107954 A1 | 5/2005 | Nahla | |
| 2005/0234679 A1* | 10/2005 | Karlsson | G05D 1/0272 702/181 |
| 2006/0047361 A1* | 3/2006 | Sato | B25J 5/007 700/245 |
| 2006/0184279 A1* | 8/2006 | Okamoto | B25J 5/007 700/245 |
| 2007/0291985 A1 | 12/2007 | Krahnstoever et al. | |
| 2009/0021351 A1* | 1/2009 | Beniyama | G05D 1/024 340/10.1 |
| 2009/0037033 A1* | 2/2009 | Phillips | G05D 1/0088 701/2 |
| 2010/0152899 A1* | 6/2010 | Chang | B25J 9/162 700/262 |
| 2010/0155156 A1* | 6/2010 | Finkelstein | B25J 5/007 180/54.1 |
| 2012/0004774 A1* | 1/2012 | Umetsu | B25J 5/007 700/254 |
| 2012/0274772 A1 | 11/2012 | Fosburgh et al. | |
| 2013/0041508 A1 | 2/2013 | Hu et al. | |
| 2013/0268118 A1* | 10/2013 | Grinstead | B25J 19/023 700/259 |
| 2014/0067188 A1* | 3/2014 | Mian | G05D 1/0229 701/28 |
| 2014/0142868 A1 | 5/2014 | Biduad | |
| 2014/0167370 A1 | 6/2014 | Eisenbarth | |
| 2014/0214208 A1* | 7/2014 | Shimizu | B25J 9/1679 700/259 |
| 2016/0059416 A1* | 3/2016 | Tian | B25J 9/1666 700/253 |
| 2016/0084642 A1* | 3/2016 | Bradski | B25J 9/163 348/47 |
| 2017/0356729 A1* | 12/2017 | Wang | B25J 9/1689 |
| 2018/0186001 A1* | 7/2018 | Scheurer | B25J 9/162 |

OTHER PUBLICATIONS

Sameshima et al.; K-tavo: a robotic behavior management module to urge a human to avoid; Proceedings of the 39nd ISR; Oct. 2008; p. 1-6.
Wang; Obstacle Avoidance Algorithms and Sensors for Autonomous Robots; ECE 4007 L03 Koblasz and Maxwell; p. 3.
Kelly et al;; "Experimental Validation of Operator Aids for High Speed Vehicle Teleoperation"; 2013; vol. 88 (pp. 951-962).
Gu et al.; "Neural predictive control for a car-like mobile robot", Robotics and Autonomous Systems; , May 2006; vol. 39, Issue 2 (pp. 73-86).
Piovesan et al.;"Randomized model predictive control for robot navigation", Proceeding ICRA'09 Proceedings of the 2009 IEEE international conference on Robotics and Automation; 2009 (pp. 1817-1822).
Erez et al.;"An integrated system for real-time model-predictive control of humanoid robots", IEEE/RAS International Conference on Humanoid Robots (Humanoids); 2013 (pp. 1-8).
U.S. Appl. No. 14/702,014, filed May 1, 2015, entitled "Systems and Methods for Control of Robotic Manipulation" 35 Pages.

* cited by examiner

SYSTEMS AND METHODS FOR CONTROL OF ROBOTIC MANIPULATION

This application claims priority to U.S. Patent Application Ser. No. 62/343,375, entitled "Systems and Methods for Control of Robotic Manipulation," filed 31 May 2016, the entire subject matter of which is hereby incorporated by reference.

BACKGROUND

A variety of tasks may be performed by a robot system that involve motion of an arm or a portion thereof. For example, a robot arm may be moved to contact or otherwise approach a target. As one example, a lever may be contacted by a robot arm. For instance, in a rail yard on one or more rail vehicle systems within the yard, a robot may be used to contact one or more brake levers. For example, between missions performed by a rail vehicle, various systems, such as braking systems, of the units of a rail vehicle may be inspected and/or tested. As one example, a brake bleeding task may be performed on one or more units of a rail vehicle system. In a rail yard, there may be a large number of rail cars in a relatively confined area, resulting in a large number of inspection and/or maintenance tasks. Conventional manipulation techniques may not provide a desired speed or accuracy in manipulation of a robot arm toward a target

BRIEF DESCRIPTION

In one embodiment, robot system is provided that includes a base, an articulable arm, a visual acquisition unit, and at least one processor. The articulable arm extends from the base and is configured to be moved toward a target. The visual acquisition unit is configured to be mounted to the arm or the base, and to acquire environmental information corresponding to at least one of the arm or the target. The at least one processor is operably coupled to the arm and the visual acquisition unit, the at least one processor configured to: generate an environmental model using the environmental information; select, from a plurality of planning schemes, using the environmental model, at least one planning scheme to translate the arm toward the target; plan movement of the arm toward the target using the selected at least one planning scheme; and control movement of the arm toward the target using the at least one selected planning scheme.

In another embodiment, a method for controlling a robot system is provided. The method includes acquiring, with a visual acquisition unit, environmental information corresponding to at least one of an arm or a target to which the arm is configured to be moved toward. The method also includes generating, with at least one processor, an environmental model using the environmental information. Further, the method includes selecting, from a plurality of planning schemes, using the environmental model, at least one planning scheme to translate the arm toward the target, and planning movement of the arm toward the target using the selected at least one planning scheme. The method also includes moving the arm toward the target using that at least one selected planning scheme.

In another embodiment, a tangible and non-transitory computer readable medium is provided. The tangible and non-transitory computer readable medium includes one or more computer software modules. The one or more computer software modules are configured to direct one or more processors to acquire, with a visual acquisition unit, environmental information corresponding to at least one of an arm or a target to which the arm is configured to be moved toward; generate, with at least one processor, an environmental model using the environmental information; select, from a plurality of planning schemes, using the environmental model, at least one planning scheme to translate the arm toward the target; plan movement of the arm toward the target using the selected at least one planning scheme; and move the arm toward the target using that at least one selected planning scheme.

DETAILED DESCRIPTION

Figure 1:
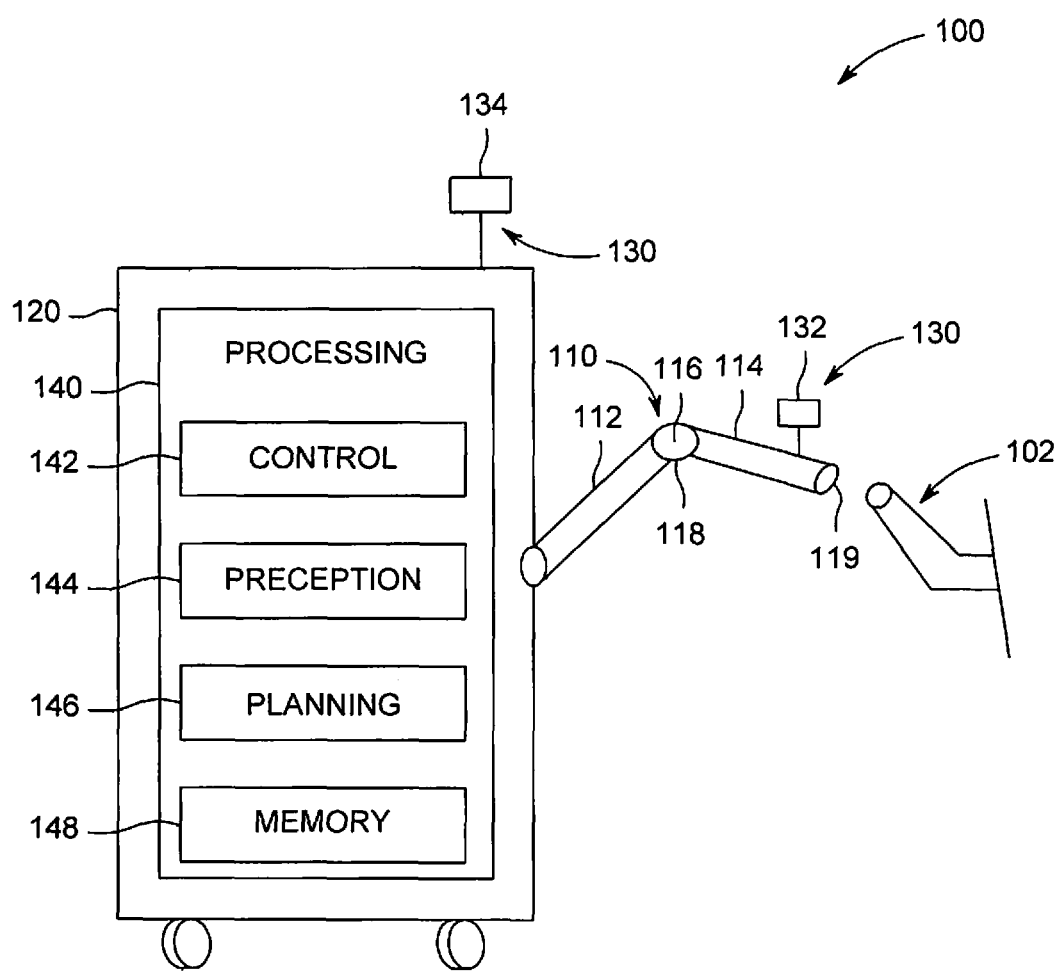
FIG. 1 is a schematic block diagram of a robotic system in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide methods and systems for control of robotic systems. For example, various embodiments provide for control of a robot to approach and/or contact a target. In some embodiments, the robotic systems are controlled to contact a lever, such as a brake lever. In various embodiments, one or more planning schemes are selected to control motion of the arm using acquired information describing or corresponding to the environment surrounding the robot arm and/or the target.

At least one technical effect of various embodiments includes improving control (e.g., continuous servo control) reliability, accuracy, and/or precision for robotic systems. At least one technical effect of various embodiments is the improvement of robotic control to account for changes in the environment (e.g., motion of a target, or introduction of an obstacle after an initial movement plan is generated).

FIG. 1 is a schematic view of a robot system 100 in accordance with various embodiments. The robot system depicted in FIG. 1 includes an articulable arm 110, a base 120, a visual acquisition unit 130, and a processing unit 120. The arm 110 extends from the base and is configured to be moved toward a target 102. For example, in the illustrated embodiment, the target 102 is a lever to be contacted by the arm 110 (or portion thereof). In some embodiments, the robot system 100 is configured for use in a railyard and the target 102 is a brake lever of a railroad car. The depicted visual acquisition unit 130 is configured to be mounted to the arm 110 or the base 120. Further, the visual acquisition unit 130 of the illustrated embodiment is configured to acquire environmental information corresponding to at least one of the arm 110 or the target 102. The processing unit 140 is operably coupled to the arm 120 (e.g., the processing unit 140 sends control signals to the arm 110 to control movement of the arm 110) and to the visual acquisition unit 130 (e.g., the processing unit 140 receives or obtains the environmental information from the visual acquisition unit 130). The depicted processing unit 140 is configured (e.g., programmed) to generate an environmental model using the environmental information, select, from a plurality of planning schemes, using the environmental model, at least one planning scheme to translate the arm 110 toward the target 120, plan movement of the arm 110 toward the target 120 using the selected at least one planning scheme, and control movement of the arm 110 toward the target 102 using the at least one selected planning scheme.

The depicted base 120, which may also be referred to as a body, provides a base from which the arm 110 extends, and also provides a structure for mounting or housing other components, such as the visual acquisition unit 130 (or aspects thereof), the processing unit 140 (or aspects thereof), communication equipment (not shown in FIG. 1), or the like. In various embodiments, the base 120 may have wheels, tracks, or the like, along with a propulsion system (e.g., motor) for mobility. For example, the base 120 may travel from a starting point at a distance too far from the target 102 for the arm 110 to contact the target 102, with the arm 110 in a retracted or home position while the base 120 is traveling. Once the base 120 is within a range of the target 102 such that the target may be reached by the arm 110, the arm 110 may be moved to contact the target 102.

The depicted arm 110 is articulable and configured to move toward the target 102 (e.g., based upon instructions or control signals from the processing unit 140). In some embodiments, the arm 110 may be configured only to contact the target 102 or otherwise approach the target 102 (e.g., a camera or sensing device at the end of the arm 110 may be positioned proximate the target for inspection of the target 102), while in other embodiments the arm 110 may include a manipulation unit (not shown in FIG. 1) that is configured to grasp the target 102, and manipulate the target 102 (e.g., to grasp and actuate a lever).

As seen in FIG. 1, the example arm 110 of the illustrated embodiment includes a first portion 112 and a second portion 114 joined by a joint 116. The first portion 112 extends from the base 120 and is articulable with respect to the base 120, and the first portion 112 and second portion 114 are articulable with respect to each other. The motion of the arm 110 (e.g., the first portion 112 and the second portion 114) may be actuated via associated motors that receive control signals provided by the processing unit 140. It may be noted that only two portions are shown in the illustrated embodiment for ease of illustration; however, arms having more portions and joints may be utilized in various embodiments. The depicted arm 110 also includes a sensor 118 configured to sense or detect position and/or motion of the arm 110 (or portions thereof) at the joint to provide feedback to the processing unit 140. The depicted arm 110 also includes a sensor 119 disposed at a distal end of the arm 110. In some embodiments, the sensor 119 is a microswitch that is triggered when the arm 110 (e.g., the distal end of the arm 110) contacts the target 102 to provide feedback information to the processing unit 140.

As discussed above, the visual acquisition unit 130 is configured to acquire environmental information corresponding to at least one of the arm 110 or the target 102. For example, the environmental information may include information describing, depicting, or corresponding to the environment surrounding the arm 110, such as a volume sufficient to describe the environment within reach of the arm 110. In various embodiments, the perception acquisition unit 110 may include one or more of a camera, stereo camera, or laser sensor. For example, the visual acquisition unit 130 may include on or more motion sensors, such as a Kinect motion sensor. The visual acquisition unit 130 in various embodiments includes an infrared projector and a camera.

It may be noted that more than one individual device or sensor may be included in the depicted visual acquisition unit 130. For example, in the illustrated embodiment, the robot system 100 includes an arm-mounted visual acquisition unit 132 and a base-mounted visual acquisition unit 134. In some embodiments, the base-mounted visual acquisition unit 134 may be used to acquire initial environmental information (e.g., with the robot system 100 en route to the target 102, and/or when the arm 110 is in a retracted position), and the arm-mounted visual acquisition unit 132 may be used to obtain additional environmental information (e.g., during motion of the arm 110 and/or when the arm 110 is near the target 102) which may be used by the processing unit 140 to dynamically re-plan movement of the arm 110, for example, to account for any motion by the target 102, or, as another example, to account for any obstacles that have moved into the path between the arm 110 and the target 102.

The processing unit 140, as discussed herein, is configured to, among other things, generate an environmental model using the environmental information. Generally, the environmental information includes information describing, depicting, or corresponding to the environment surrounding the arm 110 and/or the target 102, which may be used to determine or plan a path from the arm 110 to the target 102 that may be followed by the arm 110. In some embodiments, the desired movement is a movement of the arm 110 (e.g., a distal portion of the arm 110) toward a target such as a brake lever, or other motion in which the arm 110 is moving toward the target 102. In some embodiments, a grid-based algorithm may be utilized to model an environment (e.g., where the arm 110 will move through at least a portion of the environment to touch the target 120). It may be noted that the environmental information may also be used to identify the target 102 (e.g., based on a known size, shape, and/or other feature distinguishing the target 102 from other aspects of the environment).

In some embodiments, the environmental information may be collected using Kinect or the like. In various embodiments, point cloud data points may be collected and grouped into a grid, such as an OctoMap grid or a grid formed using another 3 dimensional mapping framework. The particular size and resolution of the grid is selected in various embodiments based on the size of the target 102, the nearness of the target 102 to the arm 110, and/or the available computational resources, for example. For example, a larger grid volume may be used for an arm 110 that has a relatively long reach or range, and a smaller grid volume may be used for an arm 110 that has a relatively short reach or range, or when the arm 110 is near the target 102. As another example, smaller grid cubes may be used for improved resolution, and larger grid cubes used for reduced computational requirements. In an example embodiment, where the robot system 100 is configured to touch a brake lever with the arm 110, and where the arm 110 has a range of 2.5 meters, the environmental model may be modeled as a sphere with a radius of 2.5 meters with cubes sized 10 centimeters×10 centimeters×10 centimeters. The sphere defining the volume of the environmental model may in various embodiments be centered around the target 102, around a distal end of the arm 110, around a visual acquisition unit (e.g., arm-mounted visual acquisition unit 132, base-mounted visual acquisition unit 134), and/or an intermediate point, for example, between a distal end of the arm 110 and the target 102.

The depicted processing unit 140 is also configured to select, from a plurality of planning schemes, at least one planning scheme to translate the arm 110 toward the target 102. The processing unit 140 uses the environmental model to select the at least one planning scheme. For example, using the relative location of the target 102 and the arm 110 (e.g., a portion of the arm configured to touch the arm 110), as well as the location of any identified obstacles between the arm 110 and the target 102, a path may be selected between the arm 100 and the target 102. Depending on the shape of the path and/or complexity (e.g., the number and/or location of obstacles to be avoided), a planning scheme may be selected. As used herein, a planning scheme may be understood as a plan that sets forth a trajectory or path of the arm 110 along a shape (or shapes) of path as defined by a predetermined coordinate system. Accordingly, in various embodiments, each planning scheme of the plurality of schemes is defined by path shape or type and a coordinate system. In various embodiments, the at least one planning scheme may be selected to reduce or minimize time of motion and/or computational requirements while providing sufficient complexity to avoid any obstacles between the arm 110 and the target 102. Generally, a motion planning scheme or algorithm is selected in various embodiments to provide for safe movement of the arm 110 within a desired time frame or at a desired speed.

In various embodiments, the processing unit 140 may select among a group of planning schemes that include at least one planning scheme that uses a first coordinate system and at least one other planning scheme that uses a second coordinate system (where the second coordinate system is different than the first coordinate system). For example, at least one planning scheme may utilize a Cartesian coordinate system, while at least one other planning scheme may utilize a joint space coordinate system.

As one example, the group of planning schemes may include a first planning scheme that utilizes linear trajectory planning in a joint space coordinate system. For example, a starting position and a target position for a motion may be defined. Then, using an artificial potential field algorithm, way points on the desired motion may be found. It may be noted that, in this planning scheme, the motion is linear in the joint space (e.g., in 6 degrees of freedom of a robot arm), but non-linear in Cartesian space. After the way points are determined, velocities may be assigned to each way point depending on the task requirements. In some embodiment, the arm 110 may be directed toward a lever that is defined in terms of 6D poses in Cartesian space. After obtaining the 6D poses in Cartesian space, the 6D pose in Cartesian space may be converted to 6 joint angles in joint space using inverse kinematics. With the joint angles determined, the desired joint angles on the motion trajectory may be determined. The first planning scheme as discussed herein (utilizing linear trajectory planning in a joint space coordinate system) may be particularly useful in various embodiments for motion in an open space, providing for relatively fast and/or easy planning in open space.

As another example, the group of planning schemes may include a second planning scheme that utilizes linear trajectory planning in a Cartesian coordinate system. For example, an artificial potential field algorithm may be used to find way points on a desired motion trajectory in Cartesian space. Then, using inverse kinematics, corresponding way point in joint space may be found, with velocities to the way points assigned to implement the control. The second planning scheme as discussed herein (utilizing linear trajectory planning in a Cartesian coordinate system) may be particularly useful in various embodiments for motion in less open space, and/or for providing motion that may be more intuitive for a human operator working in conjunction with the robot system 100.

As yet another example, the group of planning schemes may include a third planning scheme that utilizes point-to-point trajectory planning in a joint space coordinate system. In this planning scheme, target joint angles (e.g., joint angles of the portions of the arm 110 at a beginning and end of a movement) may be defined with any internal way points. The third planning scheme as discussed herein (utilizing point-to-point trajectory planning in a joint space coordinate system) may be particularly useful in various embodiments for homing or re-setting, or to bring the arm to a target position (e.g., to a retracted or home position, or to the target 102) as quickly as possible.

It may be noted that paths other than linear or point-to-point may be used. For example, a circular path (e.g., a path following a half-circle or other portion of a circle in Cartesian space) may be specified or utilized. As another example, a curved path may be employed. As another example, for instance to closely track a known surface profile, a path corresponding to a polygon or portion thereof may be employed, such as triangular or diamond shape.

It may be noted that more than one planning scheme may be employed for the movement from an initial position to the target 102. For example, a first planning scheme may be used to plan motion for a first portion of a motion, and a different planning scheme may be used to plan motion for a second portion of the motion. Accordingly, the processing unit 140 in various embodiments control movement of the arm 110 in a series of stages, with a first planning scheme used for at least one of the stages and a second, different planning scheme used for at least one other stage. In one example scenario, the first planning scheme described above may be used for an initial portion of the motion toward the target 102, for example in an open space or over a volume where precision may not be required. Then, for a portion of the motion closer to the target, the second planning scheme described above may be used for the motion toward the target 102. Finally, the third planning scheme described above may be used to retract the arm 110 from the target 102 and to a retracted or home position. Other combinations or arrangements of sequences of planning schemes used for a combined overall movement may be employed in various embodiments. Accordingly, the processing unit 140 may select not only particular planning schemes to be used, but also sequences of planning schemes and transition points between the sequences of planning schemes for planning an overall motion.

Also, the processing unit 140 of the illustrated example is configured to plan movement of the arm toward the target using the selected at least one planning scheme. After the planning scheme (or sequence of planning schemes) has been selected, the depicted processing unit 140 plans the motion. For example, a series of commands to control the motion of the arm 110 (e.g., to move the joints of the arms through a series of predetermined angular changes at pre-determined corresponding velocities) may be prepared. For example, for an arm 110 that has multiple portions, the generated motion trajectories may be defined as a sequence of way points in joint space. Each way point in some embodiments includes information for 7 joint angles, velocity, and a timing stamp. The joint angles, timing stamp, and velocity may be put in a vector of points, and a command sent to drive the arm 110 along the desired motion trajectory. For example, a program such as MotoROS may be run on the robot system 100 to implement the planned motion and commanded movement. Accordingly, the depicted processing unit 140 controls movement of the arm 110 toward the target 102 using the at least one selected planning scheme.

It may be noted that the planning and motion of the arm 110 may be adjusted in various embodiments. For example, processing unit 140 may control the visual acquisition unit 130 or portion thereof (e.g., arm-mounted visual acquisition unit 132) to acquire additional environmental information during movement of the arm 110 (e.g., during movement of the arm 110 toward the target 102). The processing unit 140 may then dynamically re-plan movement of the arm 110 (e.g., during movement of the arm 110) using the additional environmental information. For example, due to motion of the target 102 during movement of the arm 110, a previously used motion plan and/or planning scheme used to generate the motion plan may no longer be appropriate, or a better planning scheme may be available to address the new position of the target 102. Accordingly, the processing unit 140 in various embodiments uses the additional environmental information obtained during motion of the arm 110 to re-plan the motion using an initially utilized planning scheme and/or re-plans the motion using a different planning scheme.

For example, the processing unit 140 may use a first planning scheme for an initial planned movement using the environmental information (e.g., originally or initially obtained environmental information acquired before motion of the arm 110), and use a different, second planning scheme for revised planned movement using additional environmental information (e.g., environmental information obtain during movement of the arm 110 or after an initial movement of the arm 110). For example, a first planning scheme may plan a motion to an intermediate point short of the target 102 at which the arm 110 stops, additional environmental information acquired, and the remaining motion toward the target 102 planned using a second planning scheme. As another example, a first planning scheme may be used to plan an original motion; however, an obstacle may be discovered during movement, or the target 102 may be determined to move during the motion of the arm 110, and a second planning scheme used to re-plan the motion. For instance, in one example scenario, an initial motion is planned using a point-to-point in joint space planning scheme. However, an obstacle may be discovered while the arm 110 is in motion, and the motion may be re-planned using linear trajectory planning in Cartesian space to avoid the obstacle. In some embodiments, the re-planned motion in Cartesian space may be displayed to an operator for approval or modification.

As discussed herein, the depicted processing unit 140 is operably coupled to the arm 110 and the visual acquisition unit 130. For example, the processing unit 140 may provide control signals to and receive feedback signals from the arm 110, and may receive information (e.g., environmental information regarding the positioning of the target 102, the arm 110, and/or other aspects of an environment proximate to the arm 110 and/or target 102) from the visual acquisition unit 130. In the illustrated embodiment, the processing unit 140 is disposed onboard the robot system 100 (e.g., on-board the base 120); however, in some embodiments the processing unit 140 or a portion thereof may be located off-board. For example, all or a portion of the robot system 100 may be controlled wirelessly by a remotely located processor (or processors). The processing unit 140 may also be operably coupled to an input unit (not shown) configured to allow an operator to provide information to the robot system 100, for example to identify or describe a task to be performed.

The depicted processing unit 140 includes a control module 142, a perception module 144, a planning module 146, and a memory 148. It may be noted that the particular units or modules shown in FIG. 1 are meant by way of example, and that other arrangements of units or sub-units of the processing unit 140 may be employed in various embodiments, and that other types, numbers, or combinations of modules may be employed in alternate embodiments, and/or various aspects of modules described herein may be utilized in connection with different modules additionally or alternatively. Generally, the various aspects of the processing unit 140 act individually or cooperatively with other aspects to perform one or more aspects of the methods, steps, or processes discussed herein. The processing unit 140 may include processing circuitry configured to perform one or more tasks, functions, or steps discussed herein. It may be noted that "processing unit" as used herein is not intended to necessarily be limited to a single processor or computer. For example, the processing unit 140 may include multiple processors and/or computers, which may be integrated in a common housing or unit, or which may distributed among various units or housings.

The depicted control module 142 uses inputs from planning module 146 to control movement of the arm 110 The control module 142 is configured to provide control signals to the arm 110 (e.g., to one or more motors or other actuators associated with one or more portions of the arm 110).

The depicted perception module 144 is configured to acquire environmental information from the visual acquisition unit 130, and to generate an environmental model using the environmental information as discussed herein. The perception module 144 in the illustrated embodiment provides information to the planning module 146 for use in planning motion of the arm 110.

The depicted planning module 146 is configured to select one or more planning schemes for planning motion of the arm 110 as discussed herein. After selection of one or more planning schemes, the depicted planning module 146 plans the motion of the arm 110 using the one or more planning schemes, and provides the planned motion to the control module 142 for implementation.

The memory 148 may include one or more tangible and non-transitory computer readable storage media. The memory 148, for example, may be used to store information corresponding to a task to be performed, a target, control information (e.g., planned motions), or the like. Also, the memory 148 may store the various planning schemes from which the planning module 146 develops a motion plan. Further, the process flows and/or flowcharts discussed herein (or aspects thereof) may represent one or more sets of instructions that are stored in the memory 148 for direction of operations of the robot system 100.

It may be noted that the robot system 100 may include additional aspects not expressly depicted in FIG. 1. For example, the robot system 100 may also include a propulsion unit configured to move the robot system 100 between different locations, and/or a communication unit configured to allow the robot system 100 to communicate with a remote user, a central scheduling or dispatching system, or other robot systems, among others.

Figure 2:
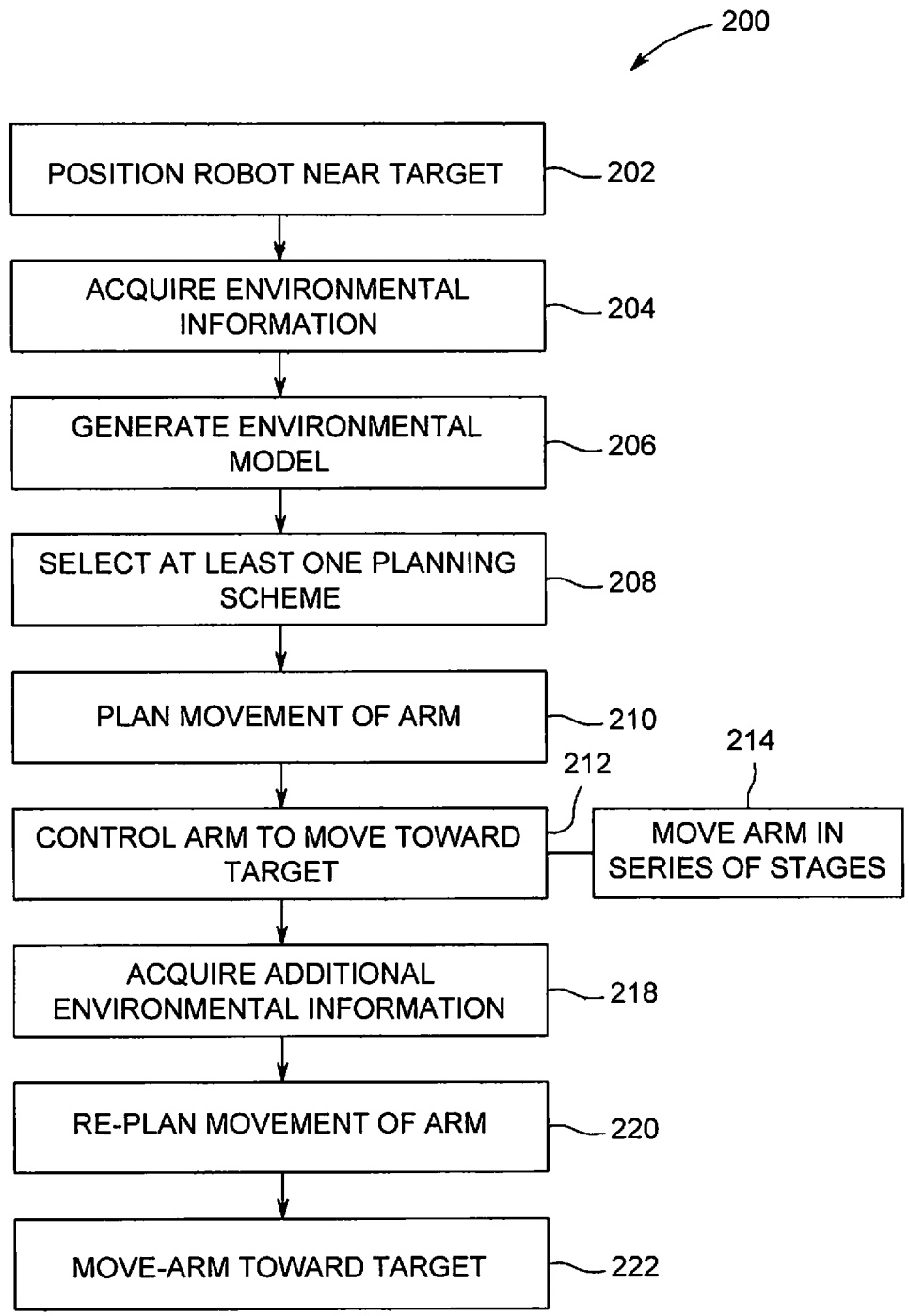
FIG. 2 is a flowchart of a method for controlling a robot in accordance with various embodiments.

FIG. 2 provides a flowchart of a method 200 for controlling a robot, for example a robot having an arm to be extended toward a target. In various embodiments, the method 200, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be able to be used as one or more algorithms to direct hardware to perform operations described herein.

At 202, a robot (e.g., robot system 100, robot system 300) is positioned near a target (e.g., target 102). The target, for example, may be a lever to be contacted by the robot. For instance, in some embodiments, the robot is configured for use in a rail yard to contact a lever (e.g., a brake lever) of a rail car. The robot may also be configured to manipulate the target or a portion thereof after being place in contact with or proximate the target. The robot may include an arm configured to extend toward the target. In the illustrated embodiment, the robot at 202 is positioned within a range of the target defined by the reach of the arm of the robot.

At 204, environmental information is acquired. In various embodiments, the environmental information is acquired with a visual acquisition unit (e.g., visual acquisition unit 130, arm-mounted visual acquisition unit 132, base-mounted visual acquisition unit 134). Generally, the environmental information corresponds to at least one of the arm or the target to which the arm is configured to be moved toward. For example, the environmental information may describe or correspond to a volume that includes the target and an arm (or portion thereof, such as a distal end) as well as any objected interposed between the arm and target or otherwise potentially contacted by a motion of the arm toward the object.

At 206, an environmental model is generated. The environmental model is generated using the environmental information acquired at 204. The environmental model, for example, may be composed of a grid of uniform cubes forming a sphere-like volume.

At 208, at least one planning scheme is selected. The at least one planning scheme is configured to be used to plan a motion of the arm toward the target, and is selected in the illustrated embodiment using the environmental model. A planning scheme may be defined by a path type or shape (e.g., linear, point-to-point) and a coordinate system (e.g., Cartesian, joint space). In various embodiments the at least one planning scheme is selected from among a group of planning schemes including a first planning scheme that utilizes a first coordinate system (e.g., a Cartesian coordinate system) and a second planning scheme that utilizes a different coordinate system (e.g., a joint space coordinate system). In various embodiments, the selected at least one planning scheme includes a sequence of planning schemes, with each planning scheme in the sequence used to plan movement for a particular portion or segment of the motion toward the target.

At 210, movement of the arm is planned. The movement of the arm is planned using the planning scheme (or sequence of planning schemes) selected at 208. At 212, the arm is controlled to move toward the object. The arm is controlled using the plan developed at 210 using the at least one scheme selected at 208.

In the illustrated embodiment, at 214, the arm is moved in a series of stages. In some embodiments, the selected planning schemes include a first planning scheme that is used for at least one of the stages and a different, second planning scheme that is used for at least one other of the stages.

In the depicted embodiment, as the arm is moved toward the target (e.g., during actual motion of the arm and/or during a pause in motion after an initial movement toward the target), at 216, additional environmental information is acquired. For example, a visual acquisition unit (e.g., arm-based visual acquisition unit 132) is controlled to acquire additional environmental information. The additional environmental information may, for example, confirm a previously used position of the target, correct an error in a previous estimate of position of the target, or provide additional information regarding movement of the target.

At 218, movement of the arm is dynamically re-planned using the additional information. As one example, if the target has moved, the movement of the arm may be re-planned to account for the change in target location. In some embodiments, the same planning scheme used for an initial or previous motion plan may be used for the re-plan, while in other embodiments a different planning scheme may be used. For example, a first planning scheme may be used for an initial planned movement using environmental information acquired at 204, and a second, different planning scheme may be used for revised planned movement using the additional environmental information acquired 216. At 220, the arm is moved toward the target using the re-planned movement. While only one re-plan is shown in the illustrated embodiment, additional re-plans may be performed in various embodiments. Re-plans may be performed at planned or regular intervals, and/or responsive to detection of movement of the target and/or detection of a previously unidentified obstacle in or near the path between the arm and the target.

Figure 3:
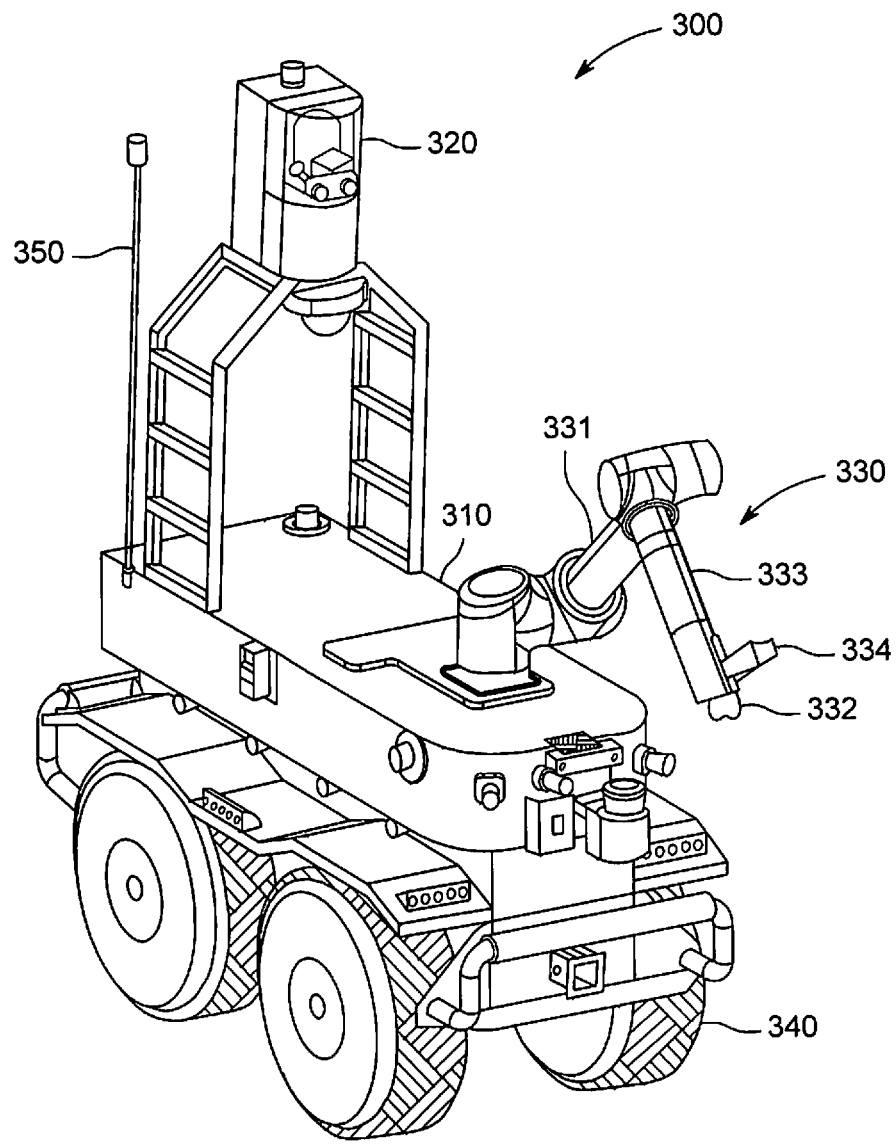
FIG. 3 is a schematic diagram of a robot in accordance with various embodiments.

FIG. 3 provides a perspective view of a robot 300 formed in accordance with various embodiments. The robot 300 may be configured for use as a rail yard robot. The robot 300 may include one or more aspects generally similar to the robot system 100 discussed in connection with FIG. 1, and in various embodiments is configured to perform one or more tasks as described in connection with FIG. 1 and/or FIG. 2. The depicted robot 300 includes a body (or base) 310. The body 310, for example, may house one or more processors (e.g., one or more processors that form all or a portion of the processing unit 140). The body 310 may also provide for the mounting of other components and/or subsystems.

In the illustrated embodiment, the robot 300 includes a base-mounted visual acquisition unit 320 mounted to the body 310. The depicted articulated arm 330 includes plural jointed sections 331, 333 interposed between a distal end 332 and the body 310. The distal end 332 is configured for contact with a target. In some embodiments, a gripper or other manipulator (not shown in FIG. 3) is disposed proximate the distal end 332. An arm-mounted visual acquisition unit 334 is also disposed on the arm 330. The base-mounted visual acquisition unit 320 and/or the arm-mounted visual acquisition unit 334 may be used to acquire environmental information as discussed herein.

The robot 300 includes wheels 340 that are configured to be driven by a motor and/or steered to move the robot 300 about an area (e.g., a rail yard) when the robot 300 is in a navigation mode. It may be noted that, additionally or alternatively, tracks, legs, or other mechanisms may be utilized to propel or move the robot 300. In the illustrated embodiment, the antenna 350 may be used to communicate with a base, other robots, or the like.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation).

For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A robot system comprising:
a base;
an articulable arm extending from the base and configured to be moved toward a target;
a visual acquisition unit configured to be mounted to the arm or the base and to acquire environmental information corresponding to at least one of the arm or the target;
at least one processor operably coupled to the arm and the visual acquisition unit, the at least one processor configured to:
generate an environmental model using the environmental information;
select, from a plurality of planning schemes, at least one planning scheme based on the environmental model generated using the environmental information to translate the arm toward the target, wherein each planning scheme is defined by at least one of path shape or path type, and wherein the at least one planning scheme selected from the plurality of planning schemes is selected to provide movement of the articulable arm within at Least one of a desired time frame or at a desired speed based on the environmental model generated using the environmental information;
plan movement of the arm toward the target using the selected at least one planning scheme; and
control movement of the arm toward the target using the at least one selected planning scheme.

2. The robot system of claim 1, wherein at least one of the planning schemes utilizes a first coordinate system, and at least one other of the planning schemes utilizes a second coordinate system that is different from the first coordinate system.

3. The robot system of claim 2, wherein the first coordinate system is a Cartesian coordinate system, and the second coordinate system is a joint space coordinate system, wherein the at least one processor is configured to select between the planning schemes based on an amount of openness determined using the environmental model generated using the environmental information.

4. The robot system of claim 1, wherein the at least one processor is configured to:
control the visual acquisition unit to acquire additional environmental information during movement of the arm; and
dynamically re-plan movement of the arm using the additional environmental information.

5. The robot system of claim 4, wherein the at least one processor is configured to use a first planning scheme for an initial planned movement using the environmental information, and to use a second planning scheme that is different from the first planning scheme for a revised planned movement using the additional environmental information.

6. The robot system of claim 4, wherein the visual acquisition unit comprises an arm-mounted visual acquisition unit.

7. The robot system of claim 1, wherein the at least one processor is configured to control the movement of the arm in a series of stages, Wherein the selected at least one planning scheme includes a first planning scheme for at least one of the stages and a second planning scheme that is different from the first planning scheme for at least one other of the stages.

8. The robot system of claim 1, wherein the plurality of planning schemes comprise:
a first planning scheme that utilizes linear trajectory planning in a joint space coordinate system;
a second planning scheme that utilizes linear trajectory planning in a Cartesian coordinate system; and
a third planning scheme that utilizes point-to-point trajectory planning in the joint space coordinate system.

9. A method for controlling a robot system, the method comprising:
acquiring, with a visual acquisition unit, environmental information corresponding to at least one of an arm or a target to which the arm is configured to he moved toward;
generating, with at least one processor, an environmental model using the environmental information;
selecting, from a plurality of planning schemes, at least one planning scheme based on the environmental model generated using the environmental information to translate the arm toward the target, wherein planning scheme is defined by at least one of path shape or path type, and wherein the at least one planning scheme selected from the plurality of planning schemes is selected to provide movement of the articulable arm within at least one of a desired time frame or at a desired speed based on the environmental model generated using the environmental information;

planning movement of the arm toward the target using the selected at least one planning scheme; and moving the arm toward the target using that at least one selected planning scheme.

10. The method of claim 9, wherein at least one of the planning schemes utilizes a first coordinate system, and at least one other of the planning schemes utilizes a second coordinate system that is different from the first coordinate system.

11. The method of claim 10, wherein the first coordinate system is a Cartesian coordinate system, and the second coordinate system is a joint space coordinate system, wherein the method includes selecting between the planning schemes based on an amount of openness determined using the environmental model generated using the environmental information.

12. The method of claim 1, further comprising:

controlling the visual acquisition unit to acquire additional environmental information during movement of the arm; and dynamically re-planning movement of the arm using the additional environmental information.

13. The method of claim 12, further comprising:

using a first planning scheme for an initial planned movement using the environmental information; and using a second planning scheme that is different from the first planning scheme for a revised planned movement using the additional environmental information.

14. The method of claim 12, wherein he visual acquisition unit comprises an arm-mounted visual acquisition unit.

15. The method of claim 1, wherein moving the arm toward the target comprises moving the arm in a series of stages, wherein the selected at least one planning scheme includes a first planning scheme for at least one of the stages and a second planning scheme that is different from the first planning scheme for at least one other of the stages.

16. A tangible and non-transitory computer readable medium comprising one or more computer software modules configured to direct one or more processors to:

acquire, with a visual acquisition unit, environmental information corresponding to at least one of an arm or a target to whiCh the arm is configured to be moved toward;

generate, with at least one processor, an environmental model using the environmental information;

select, from a plurality of planning schemes, at least one planning scheme based on the environmental model generated using the environmental information to translate the arm toward the target wherein each planning scheme is defined by at least one of path shape or path type, and wherein the at least one planning scheme selected from the plurality of planning schemes is selected to provide movement of the articulable arm within at least one of a desired time frame or at a desired speed based on the environmental model generated using the environmental information;

plan movement of the area toward the target using the selected at least one planning scheme; and move the arm toward the target using that at least one selected planning scheme.

17. The tangible and non-transitory computer readable medium of claim 16, wherein at least one of the planning schemes utilizes a first coordinate system, and at least one other of the planning schemes utilizes a second coordinate system that is different from the first coordinate system.

18. The tangible and non-transitory computer readable medium of claim 16, wherein the computer readable medium is further configured to direct the one or more processors to:

control the visual acquisition unit to acquire additional environmental information during movement of the arm; and dynamically re-plan movement of the arm using the additional environmental information.

19. The tangible and non-transitory computer readable medium of claim 18, wherein the computer readable medium is further configured to direct the one or more processors to use a first planning scheme for an initial planned movement using the environmental information, and use a second planning scheme that is different from the first planning scheme for a revised planned movement using the additional environmental information.

20. The tangible and non-transitory computer readable medium of claim 16, wherein the computer readable medium is further configured to direct the one or more processors to move the arm in a series of stages, wherein the selected at least one planning scheme includes a first planning scheme for at least one of the stages and a second planning scheme that is different from the first planning scheme for at least one other of the stages.

* * * * *